United States Patent
Iizuka et al.

(10) Patent No.: US 6,843,230 B2
(45) Date of Patent: Jan. 18, 2005

(54) CONTROL APPARATUS AND CONTROL METHOD OF INTERNAL COMBUSTION ENGINE

(75) Inventors: Isamu Iizuka, Atsugi (JP); Kenichi Machida, Atsugi (JP)

(73) Assignee: Hitachi Unisia Automotive, Ltd., Atsugi (JP)

(*) Notice: Subject to any disclaimer, the term of this patent is extended or adjusted under 35 U.S.C. 154(b) by 0 days.

(21) Appl. No.: 10/739,271

(22) Filed: Dec. 19, 2003

(65) Prior Publication Data

US 2004/0129250 A1 Jul. 8, 2004

(30) Foreign Application Priority Data

Dec. 25, 2002 (JP) ........................ 2002-373659

(51) Int. Cl.$^7$ ............................. F01L 1/34; F02D 41/34; F02P 5/15
(52) U.S. Cl. ............................ 123/406.46; 123/90.15; 123/90.16; 123/406.47; 123/492; 123/493
(58) Field of Search .......................... 123/90.11, 90.12, 123/90.14–90.16, 406.12, 406.45, 406.46, 406.47, 478, 480, 492, 493, 494

(56) References Cited

U.S. PATENT DOCUMENTS

| 5,832,901 A | * | 11/1998 | Yoshida et al. ............. 123/478 |
| 6,688,287 B2 | * | 2/2004 | Machida ..................... 123/480 |
| 6,725,842 B2 | * | 4/2004 | Matsumoto ................. 123/480 |
| 6,792,927 B2 | * | 9/2004 | Kobayashi .................. 123/480 |

FOREIGN PATENT DOCUMENTS

JP          11-062639 A          3/1999

* cited by examiner

Primary Examiner—Tony M. Argenbright
(74) Attorney, Agent, or Firm—Foley & Lardner LLP

(57) ABSTRACT

In an internal combustion engine provided with a variable valve mechanism that varies a valve operating characteristic (valve lift amount and valve operating angle) of an intake valve, the valve operating characteristic of the intake valve is detected and an intake air amount controlled by the intake valve is calculated based on the detected valve operating characteristic. Then, a change (change rate, change amount) between the newest intake air amount calculation value and a past intake air amount calculation value is calculated, and the newest engine controlled variable is calculated based on the change and engine controlled variable (basic fuel injection quantity and the like) set in the past, and then the calculated newest engine controlled variable is output for executing an engine control.

18 Claims, 17 Drawing Sheets

FIG.12
(a) VOLUME FLOW RATIO
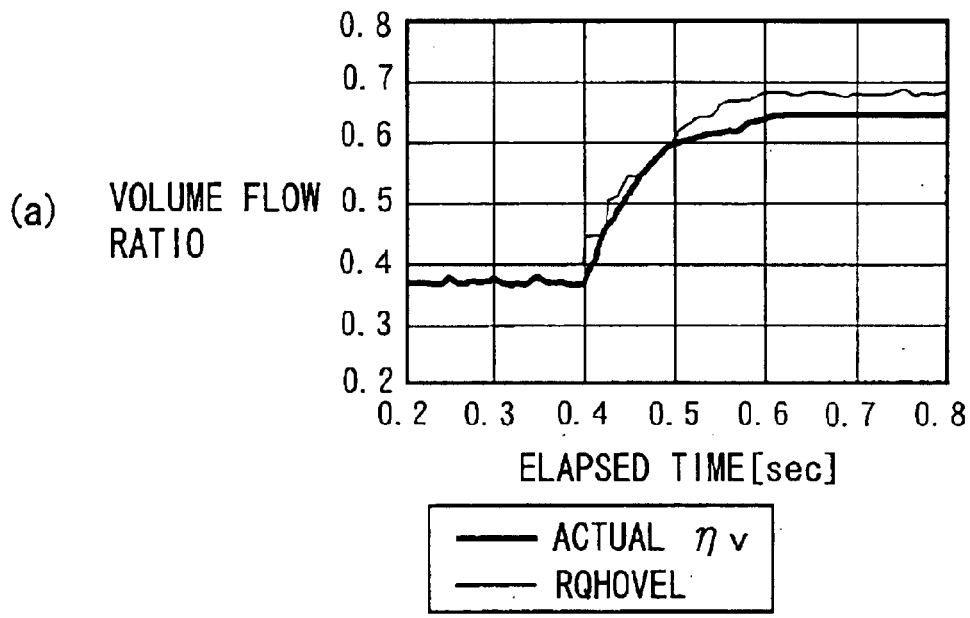
BEHAVIOR OF ηv AND OF RQHOVEL IN TRANSIENT STATE
— ACTUAL ηv
— RQHOVEL
(b) CHANGE RATE OF VOLUME FLOW RATIO
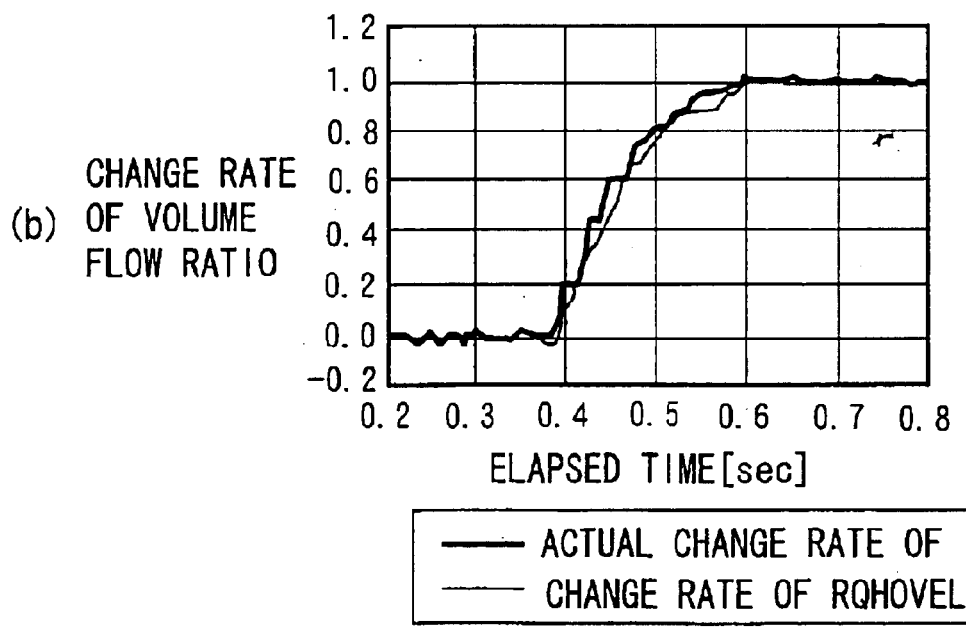
BEHAVIOR OF CHANGE RATE OF ηv AND OF CHANGE RATE OF RQHOVEL IN TRANSIENT STATE
— ACTUAL CHANGE RATE OF ηv
— CHANGE RATE OF RQHOVEL

CONTROL APPARATUS AND CONTROL METHOD OF INTERNAL COMBUSTION ENGINE

FIELD OF THE INVENTION

The present invention relates to a control apparatus and a control method of an internal combustion engine provided with a variable valve mechanism that varies a valve operating characteristic of an intake valve, and in particular, to a technique for accurately calculating engine controlled variable according to a cylinder intake air amount.

RELATED ART OF THE INVENTION

Heretofore, there has been known an engine control device in which an intake air amount is calculated based on an air amount detected by air amount detecting means, such as an air flow meter, and a detected intake pressure, to calculate a fuel injection quantity based on the intake air amount (refer to Japanese Unexamined Patent Publication 11-62639).

However, there has been developed an engine in which an intake air amount control is performed by varying a valve operating characteristic of an intake valve. In such an engine, since there occurs a detection delay from the time when the air amount actually sucked into a cylinder is changed until such a change is detected by the air amount detecting means (air flow meter), in particular, it is impossible to accurately detect the intake air amount in an engine transient state where the intake air amount is changed.

Further, in such an engine, generally, since an opening of a throttle valve disposed in an intake passage is controlled so that a predetermined negative pressure can be obtained, that is, so that an intake pressure becomes constant, it is impossible to detect the intake air amount even if such an intake pressure is detected as in the above conventional technique.

Therefore, with the conventional control device as mentioned above, in an internal combustion engine provided with a variable valve mechanism that varies a valve operating characteristic of an intake valve, where an intake air amount control is performed by varying the valve operating characteristic of the intake valve by the variable valve mechanism, it is impossible to accurately detect (calculate) the intake air amount.

Especially, in the case where the intake air amount is changed, due to the detection delay, engine controlled variable, such as a fuel injection quantity and the like, to be set according to the intake air amount, is not calculated corresponding to the change, resulting in a possibility of the reduction of engine drivability and emission performance.

SUMMARY OF THE INVENTION

The present invention has been achieved in view of the above problems and has an object to calculate engine controlled variable accurately corresponding to an intake air amount even in an engine transient state where the intake air amount is changed, to perform an appropriate engine control, in an internal combustion engine in which an intake air amount control is performed based on a valve operating characteristic of an intake valve.

In order to achieve the above object, according to the present invention, a control (engine control) is performed in the following manner on an internal combustion engine provided with a variable valve mechanism that varies a valve operating characteristic of an intake valve:

detecting the valve operating characteristic of the intake valve, to calculate an intake air amount controlled by the intake valve, based on the detected valve operating characteristic;

calculating a change between the newest intake air amount calculation value and a previous intake air amount calculation value, to calculate the newest engine controlled variable based on the calculated change and previously set engine controlled variable; and executing the control on the internal combustion engine based on the calculated newest engine controlled variable.

The other objects and features of this invention will become understood from the following description with accompanying drawings.

BRIEF EXPLANATION OF THE DRAWINGS

FIG. 12 shows the comparison of behavior of actual cylinder volume flow ratio $\eta V$ with behavior of intake valve passing volume flow ratio RQH0VEL, and the comparison of behavior of change rate of $\eta V$ with behavior of change rate of RQH0VEL.

DETAILED DESCRIPTION OF THE EMBODIMENTS

Embodiments of the present invention will be described based on the drawings.

Figure 1:
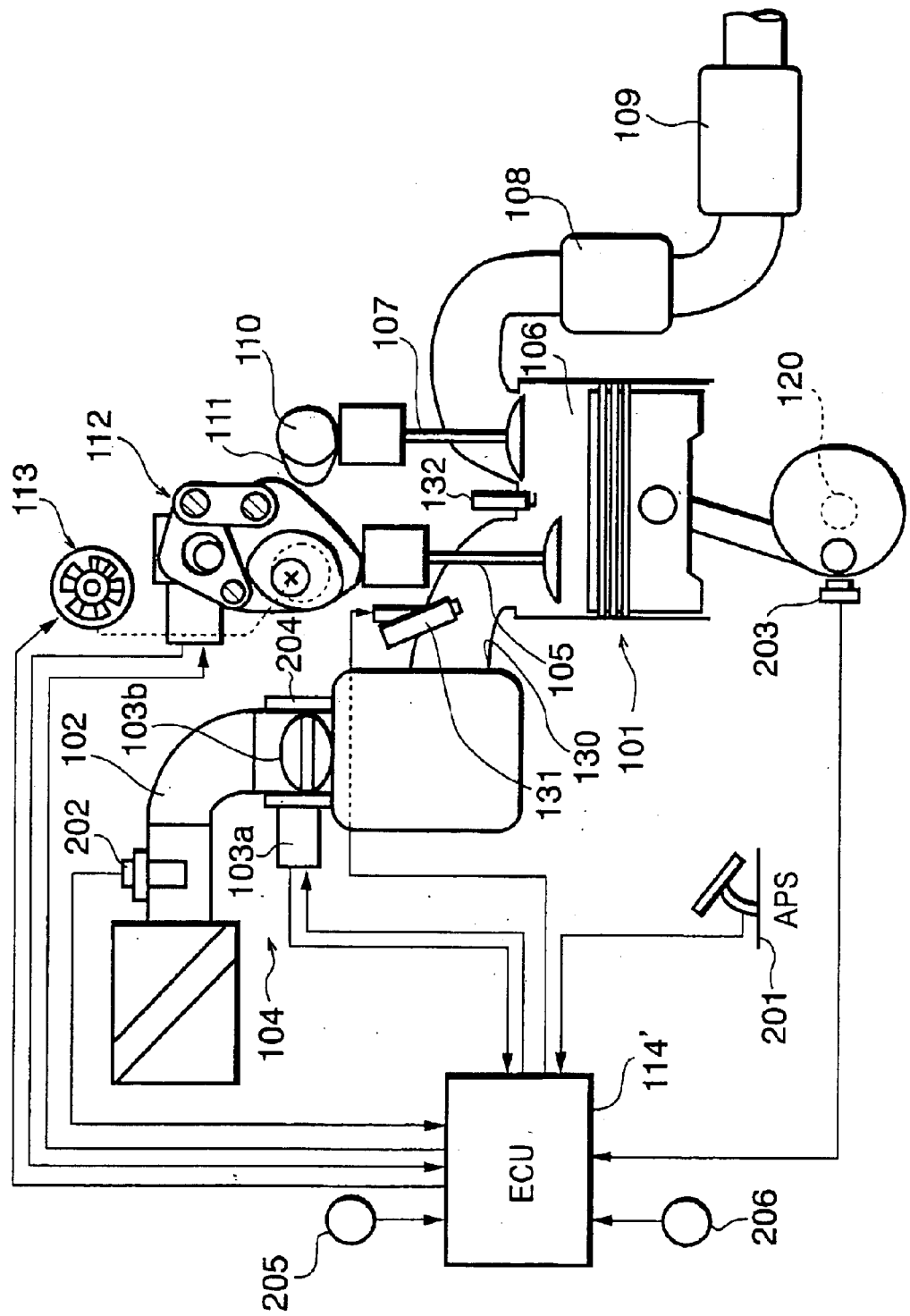
FIG. 1 is a view showing a system structure of an internal combustion engine in an embodiment of the present invention.

FIG. 1 is a structural diagram of an internal combustion engine for vehicle. In FIG. 1, in an intake passage 102 of an internal combustion engine 101, an electronically controlled throttle 104 is disposed for driving a throttle valve 103b to open and close by a throttle motor 103a. Air is sucked into a combustion chamber 106 via electronically controlled throttle 104 and an intake valve 105.

A combusted exhaust gas is discharged from combustion chamber 106 via an exhaust valve 107, purified by a front catalyst 108 and a rear catalyst 109, and then emitted into the atmosphere.

A valve lift amount and valve operating angle of intake valve 105 are successively varied by a variable valve operating angle and lift mechanism (VEL=variable valve event and lift mechanism) 112, and valve timing thereof (in other words, a center phase of the valve operating angle thereof) is successively varied by a variable valve timing mechanism (VTC=valve timing control mechanism) 113. That is, VEL 112 or/and VTC 113 corresponds to a variable valve mechanism of the present invention. Note, if a characteristic of one of the valve lift amount and the valve operating angle is determined, a characteristic of the other of the valve lift amount and the valve operating angle is also determined.

On the other hand, exhaust valve 107 is driven to open and close by a cam 111 axially supported by an exhaust side camshaft 110 which is rotated in synchronism with a crankshaft 120, while keeping a valve lift amount and a valve operating angle thereof constant.

A control unit (C/U) 114 incorporating therein a microcomputer, receives detection signals from various sensors, such as, an accelerator pedal sensor APS 201 detecting an accelerator operation amount (accelerator opening AVO), an air flow meter 202 detecting a mass air amount Qa at an upstream portion of intake passage 102, a crank angle sensor 203 taking out a rotation signal (engine rotation speed) Ne from crankshaft 120, a throttle sensor 204 detecting an opening TVO of throttle valve 103b, an intake pressure sensor 205 detecting an intake manifold pressure Pm on the downstream side of throttle valve 103b, a cam sensor 206 detecting a rotation position of intake side camshaft, and the like.

Further, an electromagnetic fuel injection valve 131 is disposed on an intake port 130 on the upstream side of intake valve 105 of each cylinder. Fuel injection valve 131 is driven to open by an injection pulse signal from C/U 114, to inject and supply fuel adjusted at a predetermined pressure. An ignition plug 132 facing combustion chamber 106 is driven by an ignition signal from C/U 114, to spark ignite an air-fuel mixture inside combustion chamber 106.

Here, structures of VEL 112 and VTC 113 will be described. However, these structures show only an example, and the present invention is not limited thereto.

Figure 2:
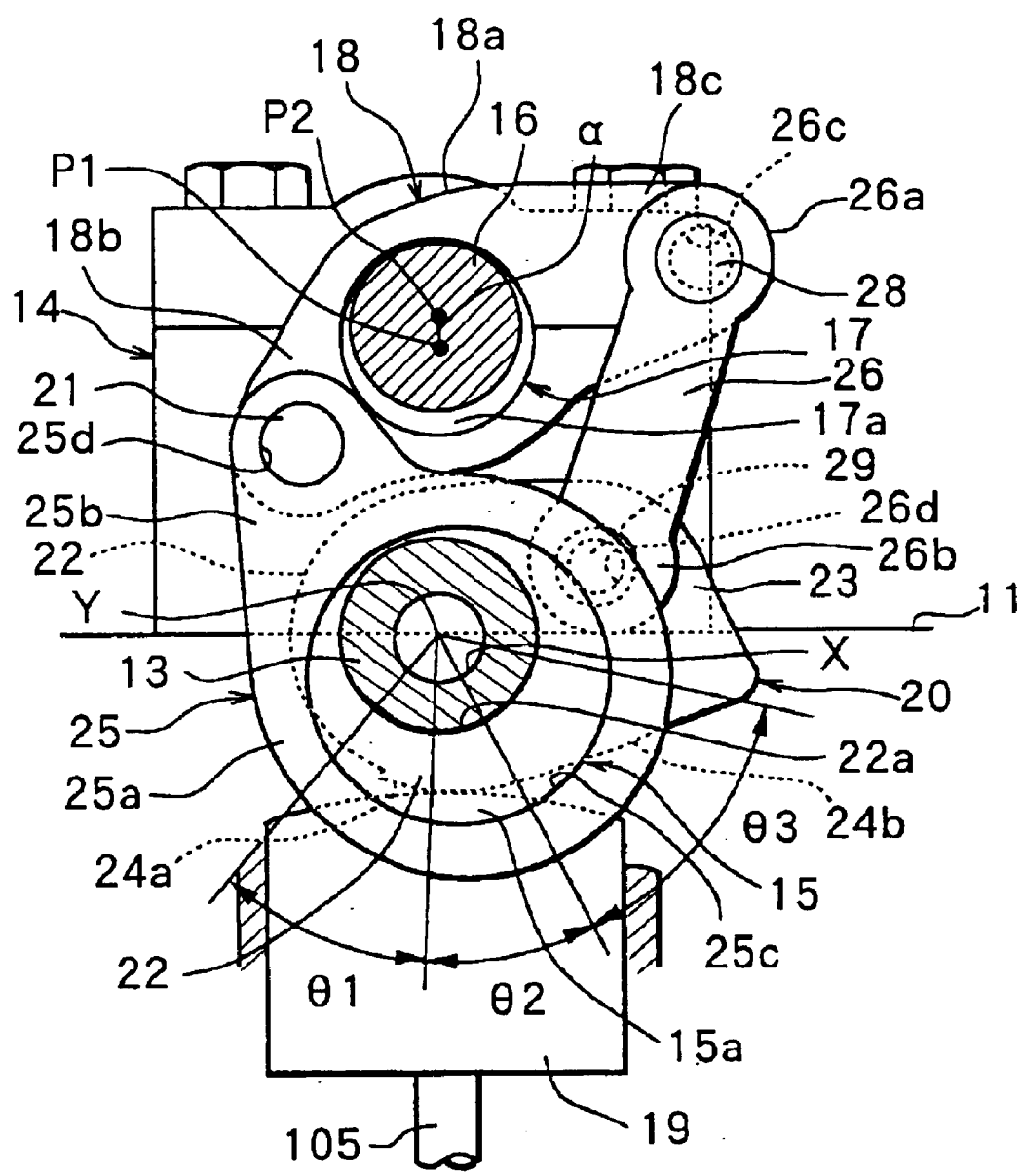
FIG. 2 is a cross section view showing a variable valve event and lift mechanism (VEL) in the embodiment (A—A cross section view of FIG. 3)
Figure 3:
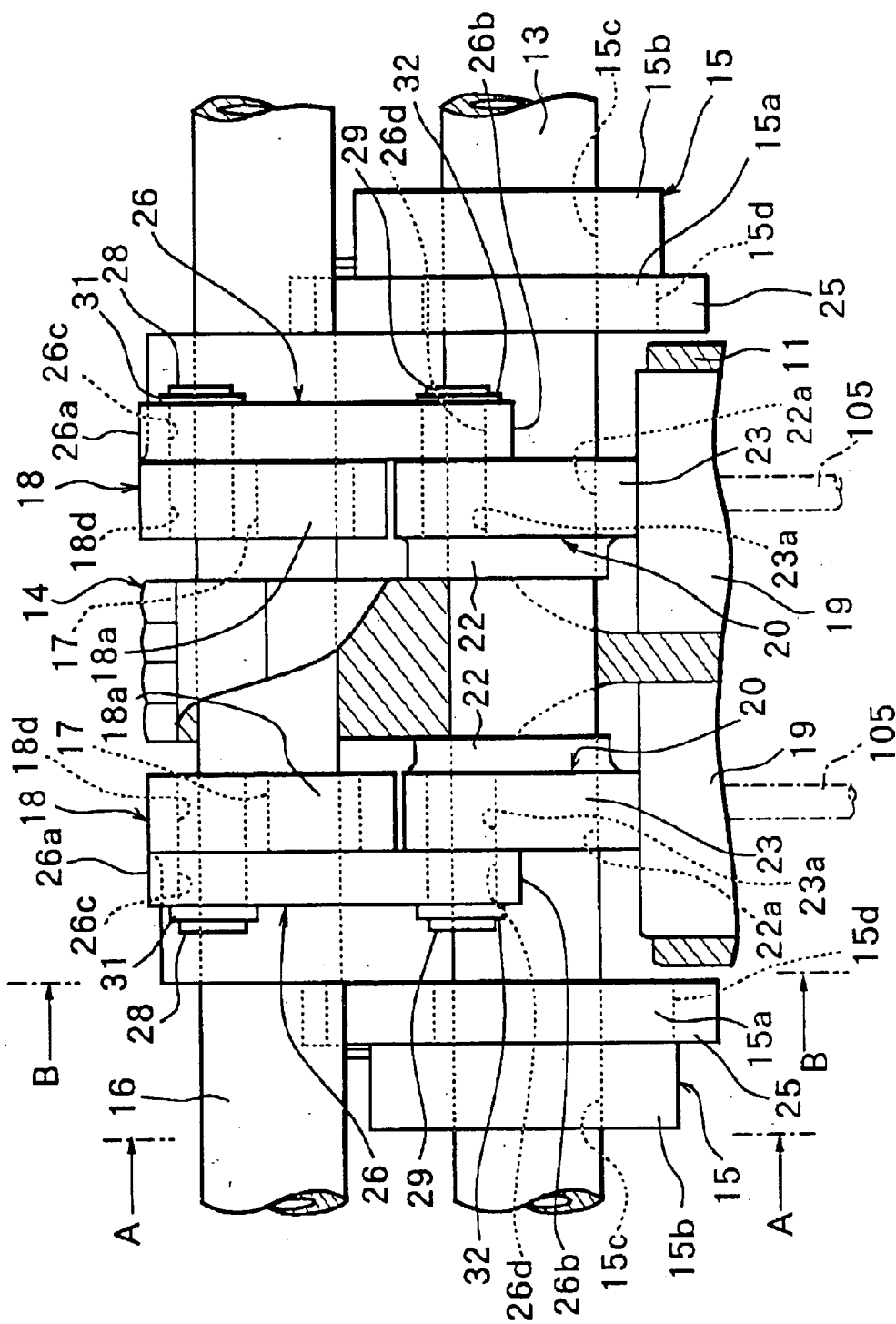
FIG. 3 is a side elevation view of the VEL.

Firstly, VEL 112 will be described. VEL 112 in the present embodiment, as shown in FIG. 2 to FIG. 4, includes a pair of intake valves 105, 105, a hollow camshaft (intake side camshaft) 13 rotatably supported by a cam bearing 14 of a cylinder head 11, to be rotated synchronized with crankshaft 120, two eccentric cams 15, 15 being rotation cams axially supported by a camshaft 13, a control shaft 16 disposed substantially in parallel to camshaft 13 at an upper position of camshaft 13, to be rotatably supported by the same cam bearing 14, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Figure 5:
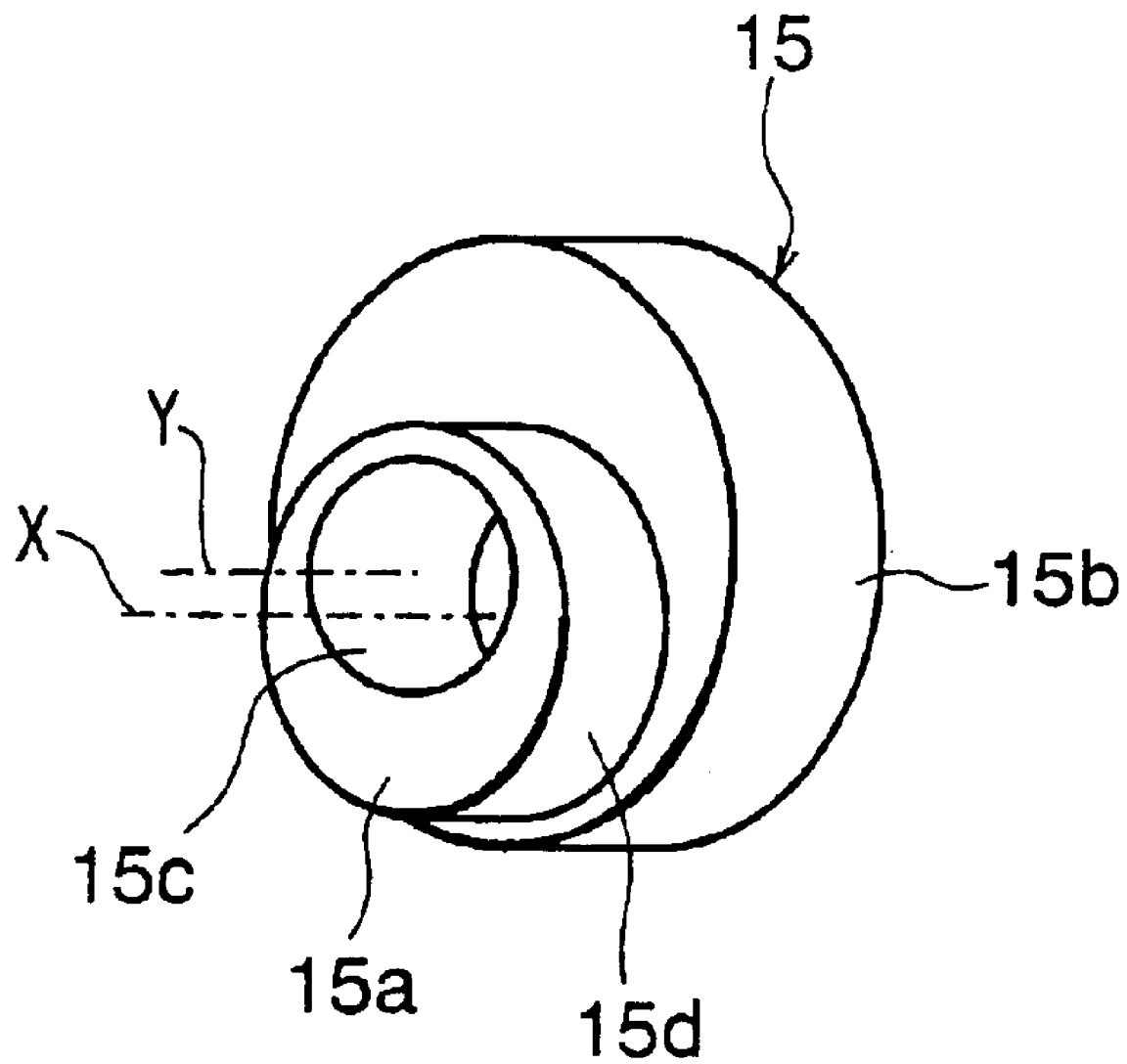
FIG. 5 is a perspective view showing an eccentric cam for use in the VEL.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam in an axial direction, and also a center axis X of cam body 15a is biased from a center axis Y of camshaft 13 by a predetermined amount. Eccentric cams 15, 15 are pressed and fixed to both outer sides of camshaft 13 via camshaft insertion holes 15c at positions not interfering with valve lifters 19, 19. Outer peripheral surfaces 15d, 15d of cam bodies 15a, 15a are formed in the same profile.

Figure 4:
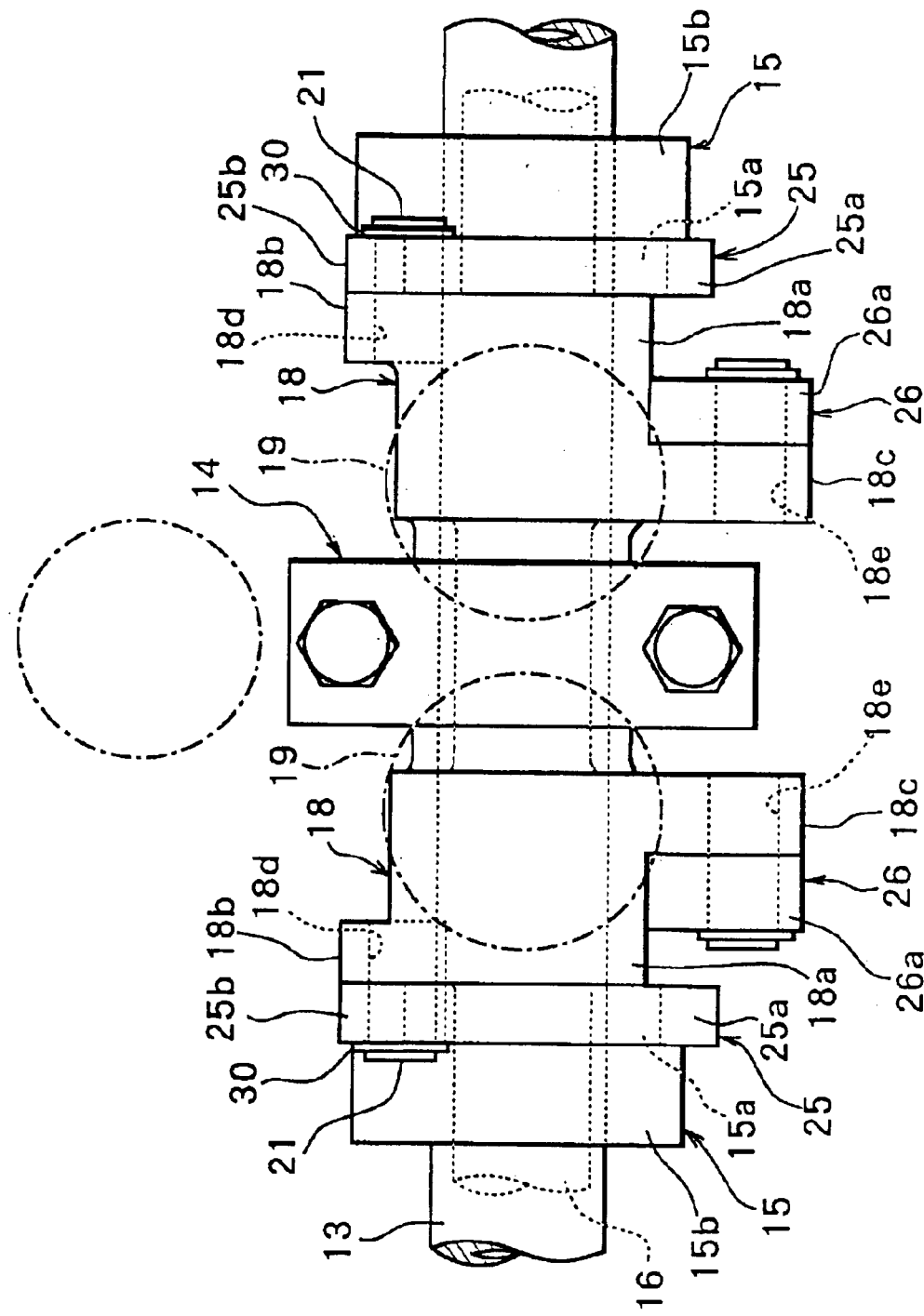
FIG. 4 is a top plan view of the VEL.

Each rocker arm 18, as shown in FIG. 4, is bent and formed in a substantially crank shape, and a central base portion 18a thereof is rotatably supported by control cam 17. A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
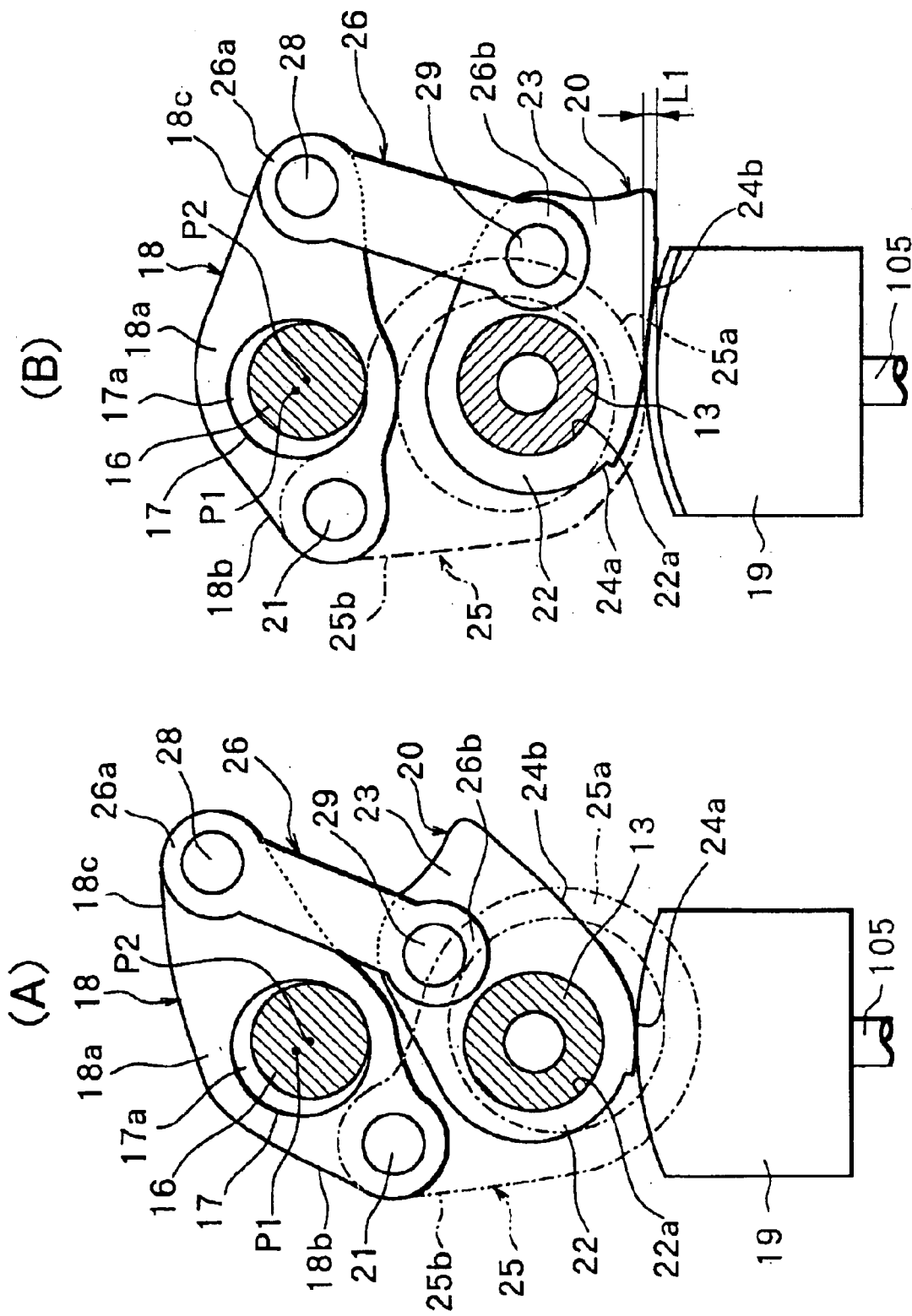
FIG. 6A and FIG. 6B are cross section views showing an operation of the VEL at a low lift condition (B—B cross section view of FIG. 3).
Figure 7:
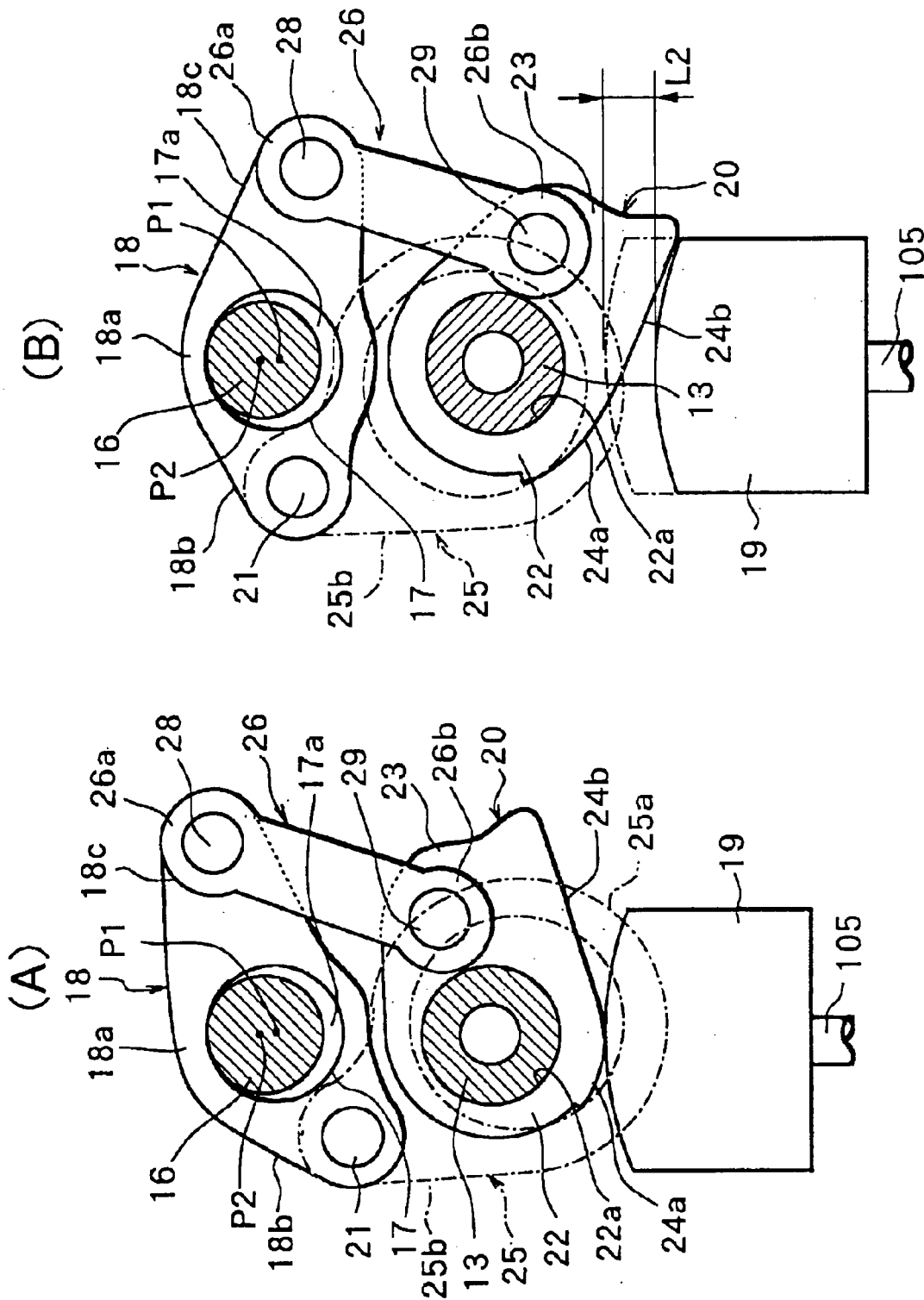
FIG. 7A and FIG. 7B are cross section views showing an operation of the VEL at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into base end portion 22 to be rotatably supported. Also, a pin hole 23a is formed through an end portion 23 positioned at the other end portion 18c of rocker arm 18.

Figure 8:
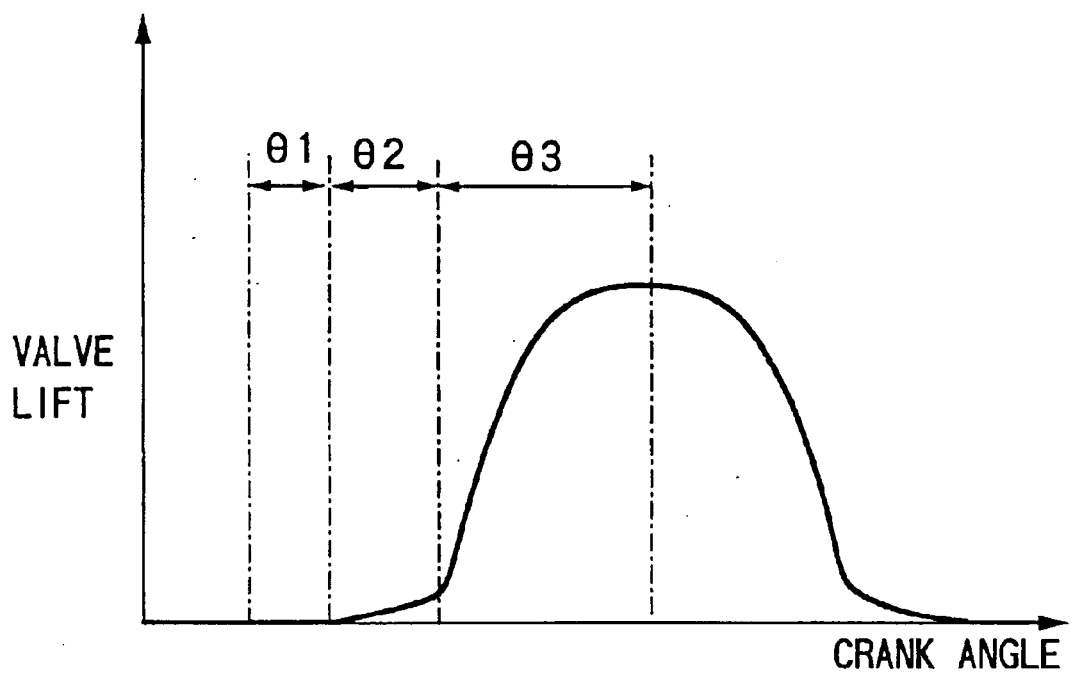
FIG. 8 is a valve lift characteristic diagram corresponding to a base end face and a cam surface of a swing cam in the VEL.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20. Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b. Link arm 25 and eccentric cam 15 constitute a swinging drive member.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d. Snap rings 30, 31, 32 restricting axial transfer of link arm 25 and link member 26 are disposed on respective end portions of pins 21, 28, 29.

Figure 9:
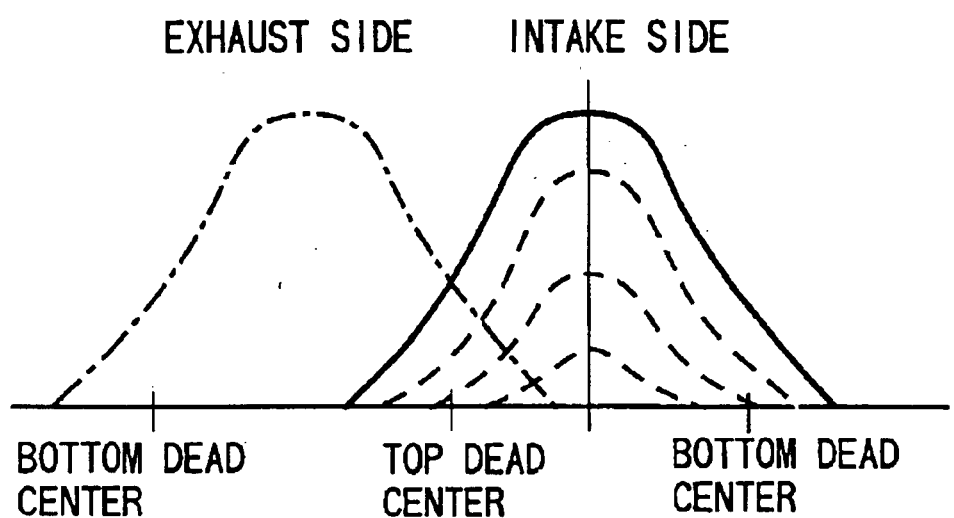
FIG. 9 is a characteristic diagram showing valve timing and valve lift of the VEL.
Figure 10:
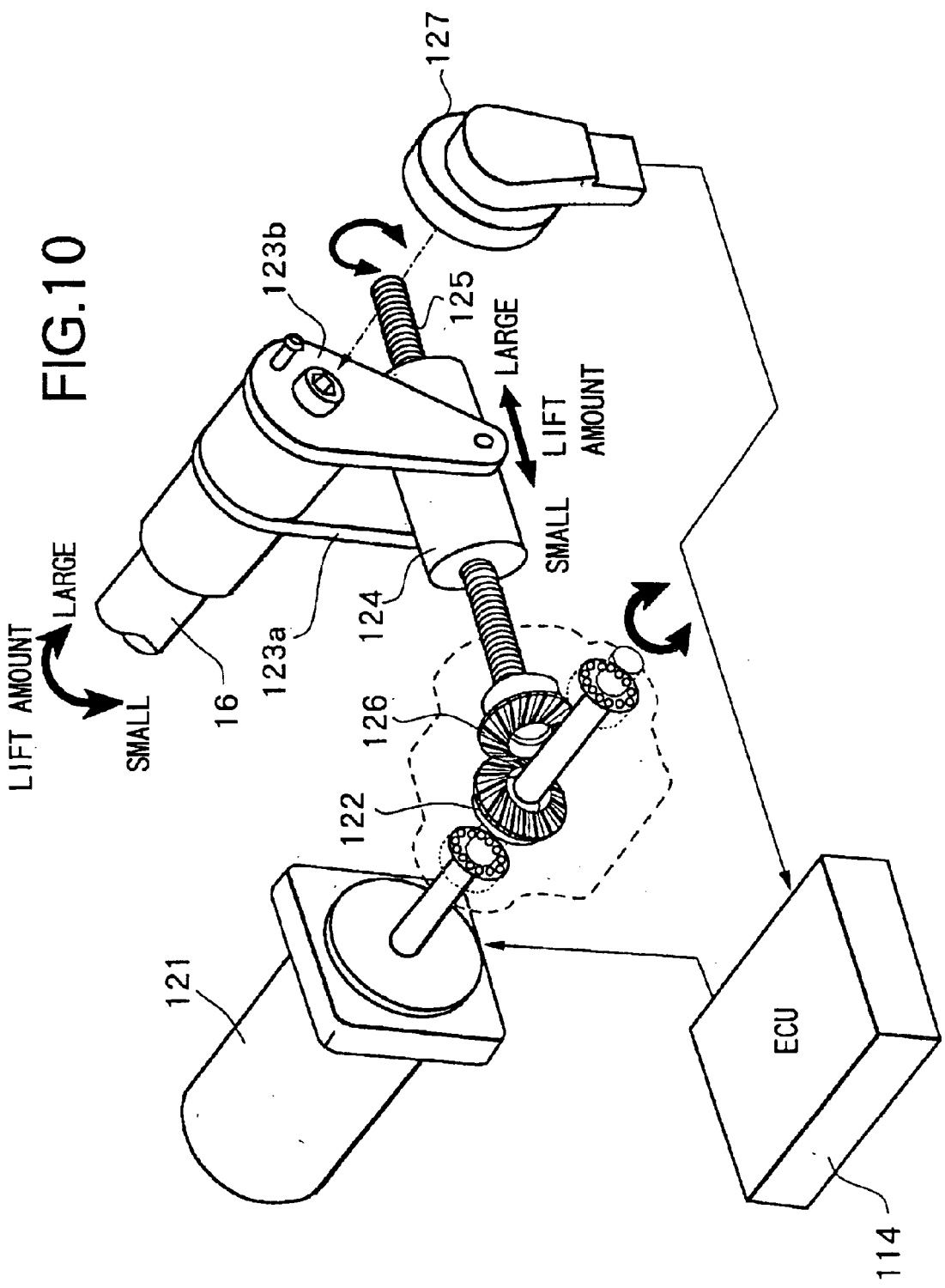
FIG. 10 is a perspective view showing a rotational driving mechanism of a control shaft in the VEL.

As shown in FIG. 10, control shaft 16 is driven to rotate within a predetermined rotation angle range by an actuator (DC servo motor) 121 disposed at one end portion thereof. By varying an operating angle (rotation angle) of control shaft 16 by actuator 121, the position of the center axis P2 of control shaft 16 relative to the center axis P1 of control cam 17 is changed so that the valve lift amount and valve operating angle of each of intake valves 105, 105 are successively varied (refer to FIG. 9). Namely, by detecting the operating angle (driving amount of VEL 112) of control shaft 16, it is possible to detect the valve lift amount and valve operating angle of each of intake valves 105, 105.

To be more specific, in FIG. 10, DC servo motor 121 is arranged so that the rotation shaft thereof is parallel with control shaft 16, and a first bevel gear 122 is axially supported by the tip portion of the rotation shaft.

A pair of stays 123a, 123b are fixed to the tip portion of control shaft 16. A nut 124 is fixed between the tip portions of the pair of stays 123a, 123b.

A second bevel gear 126 meshed with first bevel gear 122 is axially supported at the tip portion of a threaded rod 125 engaged with nut 124. The rotation of DC servo motor 121 is transmitted to threaded rod 125.

Then, threaded rod 126 is rotated by DC servo motor 121, and the position of nut 124 engaged with threaded rod 125 is displaced in the axial direction of threaded rod 125, so that control shaft 16 is rotated. Here, the valve lift amount is decreased as the position of nut 124 approaches second bevel gear 126, while the valve lift amount is increased as the position of nut 124 gets away from second bevel gear 126.

Further, a potentiometer type operating angle sensor 127 detecting the operating angle of control shaft 16 is disposed on the tip portion of control shaft 16, as shown in FIG. 10. C/U 114 feedback controls DC servo motor 121 so that an operating angle (VCS–ANGL) detected by operating angle sensor 127 coincides with a target operating angle (TGVEL). Note, as operating angle sensor 127, for example, a non-contact type, such as Hall (effect) IC type, sensor may be used, other than the above potentiometer type.

Next, VTC 113 will be described. VTC 113 in the present embodiment is a so-called vane type variable valve timing mechanism, which changes a rotation phase of a camshaft relative to a crankshaft to control valve timing (opening/closing timing) while keeping a valve operating angle constant.

Figure 11:
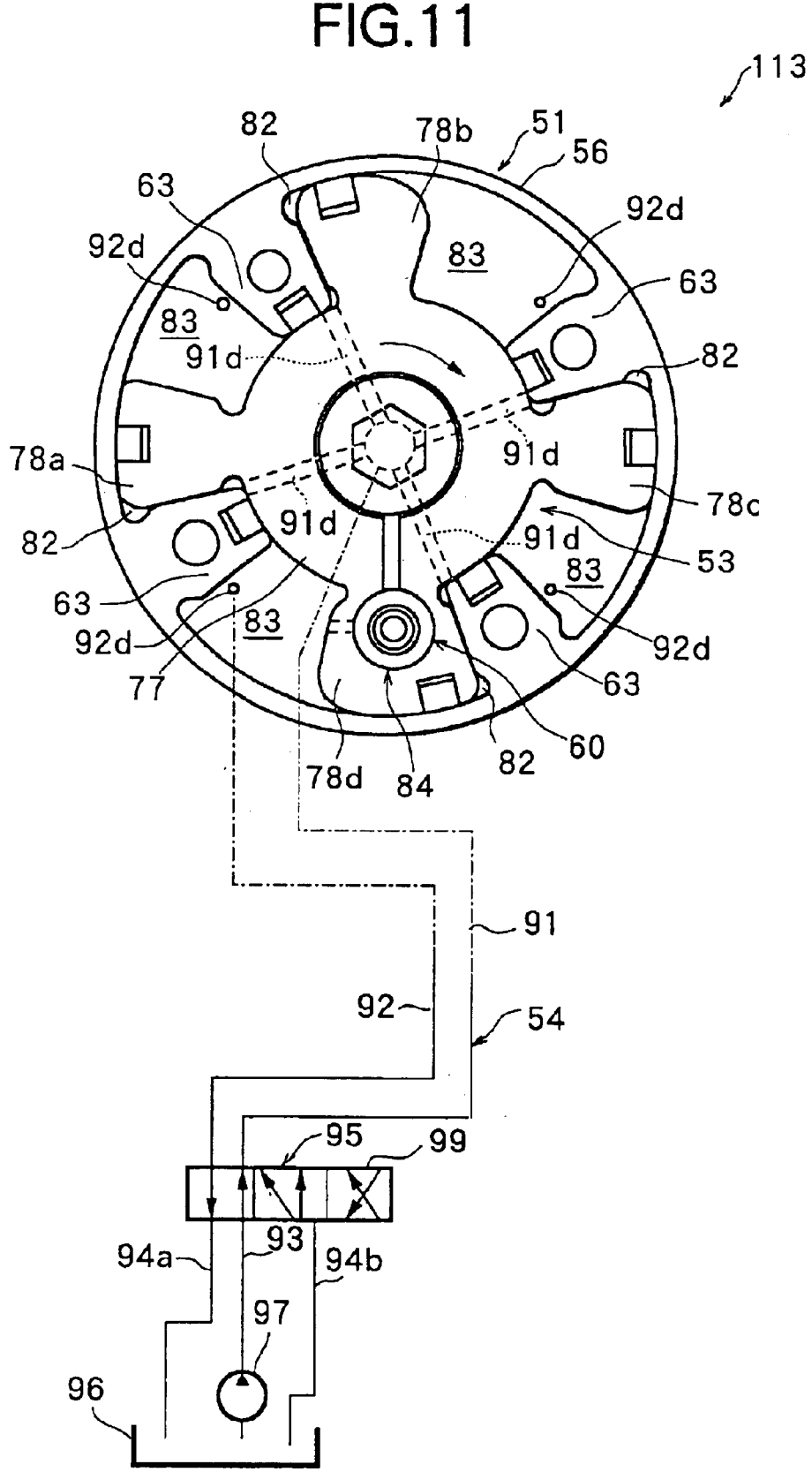
FIG. 11 is a longitudinal section view of a valve timing control mechanism (VTC) in the embodiment.

In FIG. 11, VTC 113 comprises: a cam sprocket 51 (timing sprocket) which is rotatably driven by crankshaft 120 via a timing chain; a rotation member 53 secured to an end portion of intake side camshaft 13 and rotatably housed inside cam sprocket 51; a hydraulic circuit 54 that relatively rotates rotation member 53 with respect to cam sprocket 51; and a lock mechanism 60 that selectively locks a relative rotation position between cam sprocket 51 and rotation member 53 at predetermined positions.

Cam sprocket 51 comprises: a rotation portion (not shown in the figure) having on an outer periphery thereof, teeth for engaging with timing chain (or timing belt); a housing 56 located forward of the rotation portion, for rotatably housing rotation member 53; and a front cover and a rear cover (not shown in the figure) for closing the front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting an approximately trapezoidal shape in transverse section and being respectively provided along the axial direction of housing 56.

Rotation member 53 is secured to the front end portion of intake side camshaft 13 and comprises an annular base portion 77 having first to fourth vanes 78a, 78b, 78c, and 78d provided on an outer peripheral face of base portion 77 at 90° in the circumferential direction.

First through fourth vanes 78a to 78d present approximate inverted trapezoidal shapes to partition portions 63, and disposed in recess portions between each partition portion 63, so as to form spaces in the recess portions to the front and rear in the rotation direction. Advance angle side hydraulic chambers 82 and retarded angle side hydraulic chambers 83 are formed between both sides of each of first to fourth vanes 78a to 78d and both sides of each of partition portions 63.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a first oil pressure passage 91 for supplying and discharging oil pressure to advance angle side hydraulic chambers 82, and a second oil pressure passage 92 for supplying and discharging oil pressure to retarded angle side hydraulic chambers 83. To these two oil pressure passages 91 and 92 are connected a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in a base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

With electromagnetic switching valve 95, an internal spool valve is arranged so as to control the relative switching between respective oil pressure passages 91 and 92, and supply passage 93 and drain passages 94a and 94b.

C/U 114 controls the power supply quantity for an electromagnetic actuator 99 that drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 47 is supplied to retarded angle side hydraulic chambers 83 via second oil pressure passage 92, and the hydraulic fluid in advance angle side hydraulic chambers 82 is discharged into oil pan 96 from first drain passage 94a via first oil pressure passage 91. Consequently, an inner pressure of retarded angle side hydraulic chambers 83 becomes high while an inner pressure of advance angle side hydraulic chambers 82 becomes low, and rotation member 53 is rotated to the most retarded angle side by means of vanes 78a to 78d. The result of this is that the opening period (opening timing and closing timing) of intake valve 105 is delayed.

On the other hand, when a control signal of duty ratio 100% (ON signal) is output to electromagnetic actuator 99, the hydraulic fluid pumped from oil pump 47 is supplied to inside of advance angle side hydraulic chambers 82 via first oil pressure passage 91, and the hydraulic fluid in retarded angle side hydraulic chambers 83 is discharged to oil pan 96 via second oil pressure passage 92, from second drain passage 94b. Therefore, the inner pressure of retarded angle side hydraulic chambers 83 become low. Consequently, rotation member 53 is rotated to the full to the advance angle side by means of vanes 78a to 78d. Due to this, the opening period (opening timing and closing timing) of the intake valve 105 is advanced.

In the constitution as mentioned in the above, C/U 114 controls electronically controlled throttle 104, VEL 112 and VTC 113, so that a target intake air amount corresponding to the accelerator opening can be obtained, while generating a requested negative pressure by the opening of throttle valve 103b and the operating characteristic of intake valve 105.

Further, C/U 114 calculates a fuel injection quantity corresponding to an intake air amount and also sets optimum ignition timing according to the calculated fuel injection quantity, to output signals corresponding to the fuel injection quantity and the ignition timing, respectively, to fuel injection valve 131 and ignition plug 132.

Here, in a steady state of engine where the operating characteristic of intake valve 105 is approximately constant (that is, the intake air amount is approximately constant), the calculation of fuel injection quantity and the setting of ignition timing may be performed based on an intake air amount detection value by air flow meter 202. However, in a transient state of engine where the operating characteristic of intake valve 105 is changed (that is, the intake air amount is changed), due to a detection delay, it is impossible to accurately detect the intake air amount by air flow meter 202. Therefore, the calculation of fuel injection quantity and the setting of ignition timing cannot be performed appropriately.

On the other hand, in a state where the intake pressure (negative pressure) is constant, although an intake air amount calculation value based on the valve operating characteristic of intake valve 105 (to be specific, an intake valve passing volume flow ratio RQH0VEL to be described later) is not suitable as an absolute value, a phase of actual cylinder intake air amount (actual volume flow ratio) $\eta V$ can be substantially traced, and further, from the comparison between change rates of RQH0VEL and $\eta V$, it has been confirmed from the experiment that the accuracy in the calculation of fuel injection quantity and in the setting of ignition timing is further improved (refer to FIG. 12).

Therefore, in the present embodiment, in the steady state (the intake air amount is constant), as in the conventional technique, engine controlled variable, such as fuel injection quantity, ignition timing and the like, is calculated based on the intake air amount detection value by air flow meter 202, while in the transient state (the intake air amount is changed, that is, VEL 112 is operated), by using the change rate of intake valve passing volume flow ratio RQH0VEL (the intake air amount calculation value based on the valve operating characteristic of intake valve), the engine controlled variable accurately corresponding to the actual intake air amount is calculated to be output for performing an engine control.

In the following, there will be described the intake air amount control and the calculation of a basic fuel injection quantity TP representing the engine controlled variable, executed by C/U 114.

Figure 13:
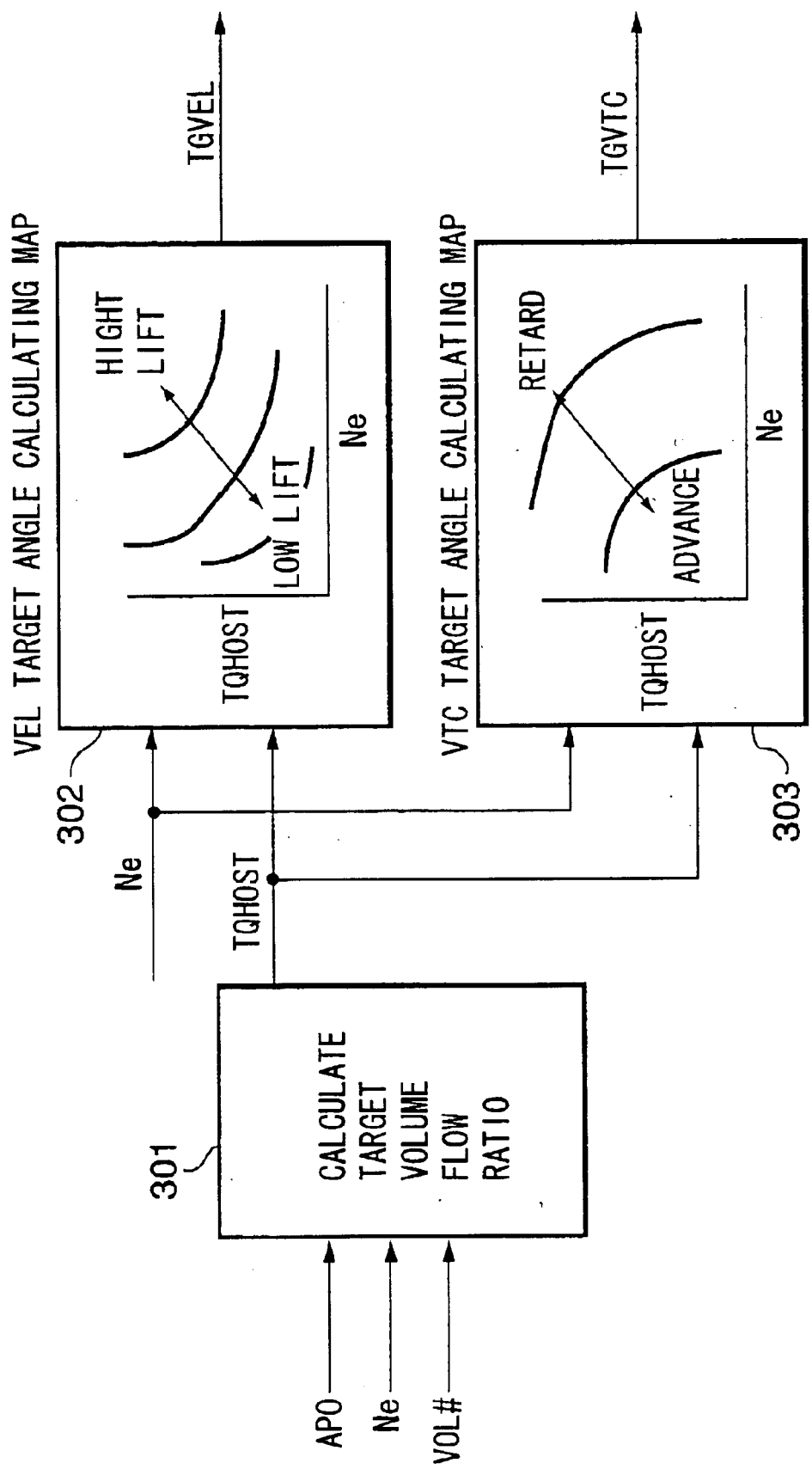
FIG. 13 is a block diagram showing the setting of a VEL target operating angle and a target phase angle (TGVTC) of the VTC.
Figure 14:
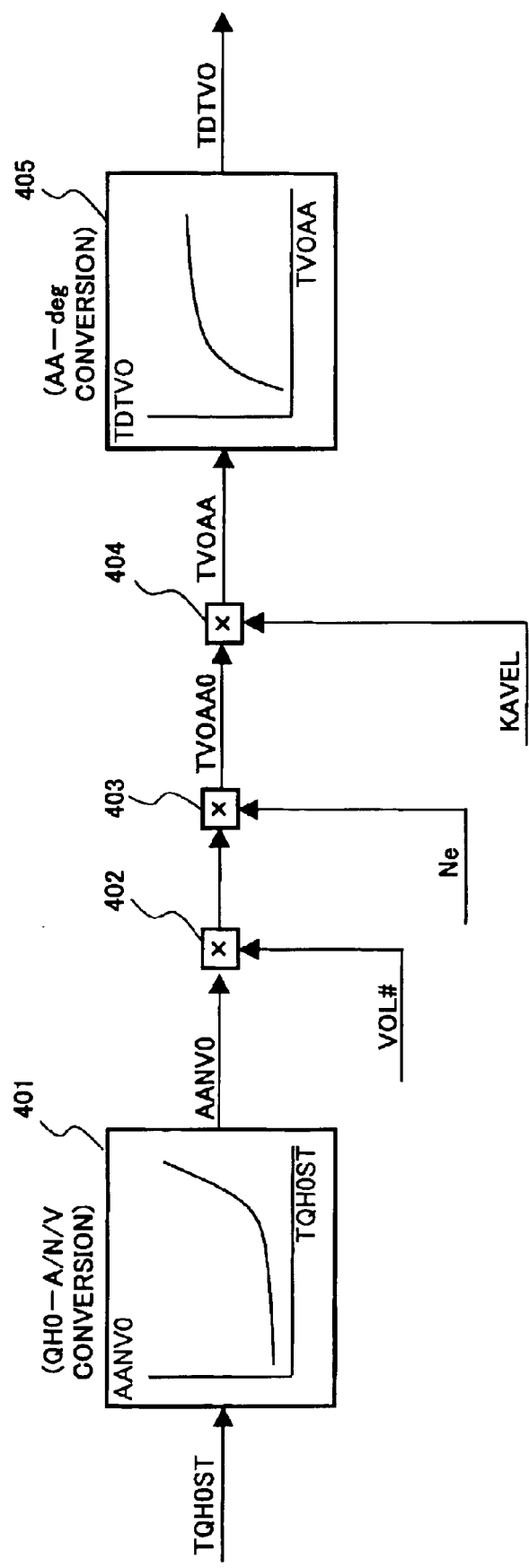
FIG. 14 is a block diagram showing the setting of a target opening (TDTVO) of a throttle valve.
Figure 15:
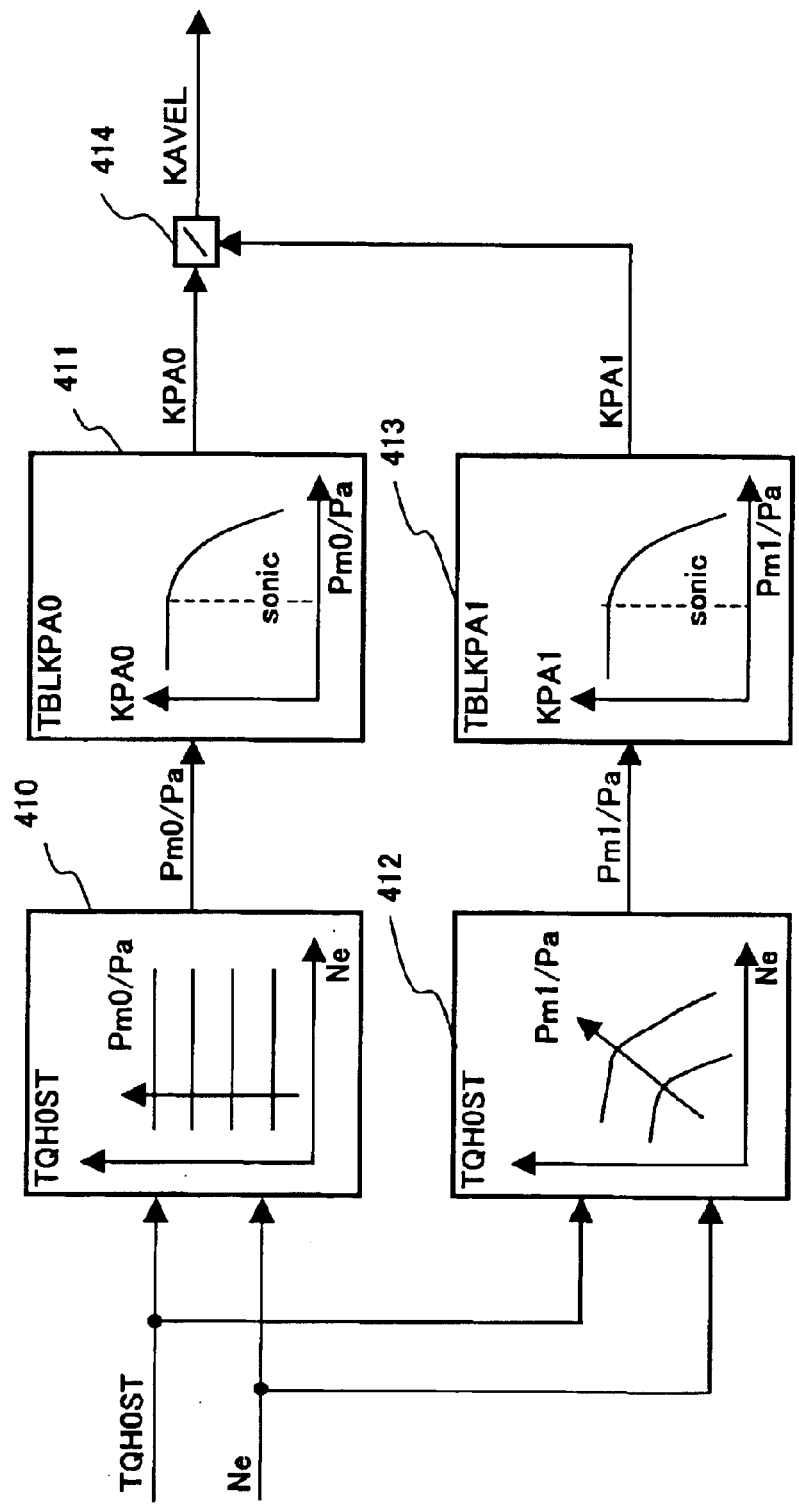
FIG. 15 is a block diagram showing the calculation of an intake valve opening based correction value KAVEL

FIG. 13 to FIG. 15 are block diagrams showing the controls of electronically controlled throttle 104, VEL 112 and VTC 113.

FIG. 13 is the block diagram showing the setting of target operating angle (TGVEL) of VEL 112 and a target phase angle (TGVTC) of VTC 113. In FIG. 13, a target volume flow ratio calculating section 301 calculates a target volume flow ratio TQH0ST (corresponding to target intake air amount) of engine 101, in the following manner.

Firstly, a requested air amount Q0 corresponding to the accelerator opening APO and the engine rotation speed Ne is calculated, and also a requested ISC air amount QISC (requested air amount at idling) requested in an idle rotation speed control (ISC) is calculated.

Then, the requested air amount Q0 is added with the requested ISC air amount QISC to calculate the total requested air amount Q (=Q0+QISC). The resultant total requested air amount Q is divided by the engine rotation speed Ne and an effective discharge amount (total cylinder volume) VOL# to calculate a target volume flow ratio TQH0ST (=Ne·VOL#).

In a VEL target angle calculating section 302, the target operating angle TGVEL (that is, a target lift amount) of control shaft 16 in VEL 112 is calculated based on the target volume flow ratio TQH0ST and the engine rotation speed Ne, to be output. Thus, actuator 121 is driven so that the VEL operating angle VCS–ANGL reaches the target operating angle TGVEL.

Here, the larger the target volume flow ratio TQH0ST is and the higher the engine rotation speed Ne is, the target operating angle TGVEL is set such that the lift amount becomes larger. However, due to a minimum limit of lift amount, at the side of low load and low rotation, the target operating angle TGVEL achieving a lift amount larger than a requested value corresponding to the target volume flow ratio TQH0ST is set and adjusted by throttling throttle valve 103b.

In a VTC target angle calculating section 303, the target phase angle TGVTC (target advance amount) in VTC 113 is calculated based on the target volume flow ratio TQH0ST and the engine rotation speed Ne, to be output. Thus, a power supply quantity to electromagnetic actuator 99 is controlled so that a present rotation phase VTCNOW reaches the target phase angle TGVTC.

Here, the larger the target volume flow ratio TQH0ST is and the higher the engine rotation speed Ne is, the target phase angle TGVTC at which the valve timing is retarded is set.

FIG. 14 is the block diagram showing the setting of a target opening TDTVO of throttle valve 103b. In FIG. 14, in a first conversion section 402, the target volume flow ratio TQH0ST is converted into a state amount AANV0 using a conversion table as shown in the figure. This state amount AANV0 is represented by At/(Ne·VOL#) when the throttle opening area is At, the engine rotation speed is Ne, and the discharge amount (cylinder volume) is VOL#.

Then, the AANV0 is multiplied by the engine rotation speed Ne in a first multiplication section 402, and further multiplied by the discharge amount VOL# in a second multiplication section 403, to be set to a basic throttle opening area TVOAA0. Note, such a basic throttle opening area TVOAA0 is a throttle opening area requested when intake valve 105 has a standard valve operating characteristic (to be referred to as Std. valve operating characteristic hereunder).

In a third multiplication section 404, a correction according to the actual operating characteristic of intake valve 105 (which is changed from Std. valve operating characteristic) is made by multiplying an intake valve opening based correction value KAVEL on the basic throttle opening area TVOAA0, to set a throttle opening area TVOAA. The setting of the intake valve opening based correction value KAVEL will be described later (refer to FIG. 15).

Then, in a second conversion section 405, using a conversion table as shown in the figure, the throttle opening area TVOAA is converted into the target opening (angle) TDTVO of throttle valve 103b, and this target opening TDTVO is output. Thus, electronically controlled throttle 104 is controlled so that the opening of throttle valve 103b reaches the target opening TDTVO, and a target negative pressure is generated.

FIG. 15 is the block diagram showing the calculation of the intake valve opening based correction value KAVEL. The intake valve opening based correction value KAVEL is set so as to ensure a constant air amount even if the operating characteristic of intake valve 105 is changed (from Std. valve operating characteristic), and specifically is calculated as follows.

At first, an air flow amount Qth (t) (kg/sec) passing through throttle valve 103b can be represented by the following equations (1) and (2).

At choke time:

$$\frac{Pc}{Pm} \leq \left(\frac{2}{\gamma+1}\right)^{\frac{\gamma}{\gamma-1}}$$

$$Qth(t) = \frac{At \cdot Pa}{\sqrt{R \cdot Ta}} \sqrt{\gamma} \left(\frac{2}{\gamma-1}\right)^{\frac{\gamma+1}{2(\gamma-1)}} \quad (1)$$

At no choke:

$$Qth(t) = \frac{At \cdot Pa}{\sqrt{R \cdot Ta}} \left(\frac{Pm}{Pa}\right)^{\frac{1}{\gamma}} \sqrt{\frac{2\gamma}{\gamma-1}\left(1-\left(\frac{Pm}{Pa}\right)^{\frac{\gamma-1}{\gamma}}\right)} \quad (2)$$

In the above equations, Pa: atmospheric pressure (Pa), Pm: manifold pressure (Pa), Ta: outside air temperature (K), and At: throttle opening area (m$^2$).

Thereby, in order to keep the air amount constant even if the operating characteristic of intake valve 105 is changed (from state 0 to state 1), the following equation (3) is required to be established.

$$\frac{At0 \cdot Pa}{\sqrt{R \cdot Ta}}\left(\frac{Pm0}{Pa}\right)^{\frac{1}{\gamma}} \sqrt{\frac{2\gamma}{\gamma-1}\left(1-\left(\frac{Pm0}{Pa}\right)^{\frac{\gamma-1}{\gamma}}\right)} = \frac{At1 \cdot Pa}{\sqrt{R \cdot Ta}}\left(\frac{Pm1}{Pa}\right)^{\frac{1}{\gamma}} \sqrt{\frac{2\gamma}{\gamma-1}\left(1-\left(\frac{Pm1}{Pa}\right)^{\frac{\gamma-1}{\gamma}}\right)} \quad (3)$$

In the above equation, Pa: atmospheric pressure, Ta: outside air temperature, Pm0: target manifold pressure at Std. valve operating characteristic, Pm1: target manifold pressure after the valve operating characteristic is changed, At0: throttle valve opening area at Std. valve operating characteristic, and At1: throttle opening area after the valve operating characteristic is changed.

Accordingly, a relation between the throttle opening area At0 at Std. valve operating characteristic and the throttle opening area At1 after the valve operating characteristic is changed (that is, VEL 112 is operated) is represented by the following equation (4), which is the intake valve opening based correction value KAVEL.

$$KAVEL = \frac{At1}{At0} = \frac{\left(\frac{Pm0}{Pa}\right)^{\frac{1}{\gamma}} \sqrt{1-\left(\frac{Pm0}{Pa}\right)^{\frac{\gamma-1}{\gamma}}}}{\left(\frac{Pm1}{Pa}\right)^{\frac{1}{\gamma}} \sqrt{1-\left(\frac{Pm1}{Pa}\right)^{\frac{\gamma-1}{\gamma}}}} \quad (4)$$

Therefore, in a standard pressure ratio calculating section 410, a ratio between the target manifold pressure Pm0 at Std. valve operating characteristic and the atmospheric pressure Pa (Pm0/Pa; standard pressure ratio) is obtained by referring to a map previously allotted in performance as shown in the figure, based on the target volume flow ratio TQH0ST and the engine rotation speed Ne.

Then, in a KPA0 calculating section 411, a coefficient KPA0 is calculated by retrieving a table TBLKPA0 as shown in the figure, based on the standard pressure ratio (Pm0/Pa). Note, this coefficient KPA0 can be represented by the following equation (5) and corresponds to a value of the numerator in the equation (4).

$$KPA0 = \left(\frac{Pm0}{Pa}\right)^{\frac{1}{\gamma}} \sqrt{1-\left(\frac{Pm0}{Pa}\right)^{\frac{\gamma-1}{\gamma}}} \quad (5)$$

On the other hand, in a target pressure ratio setting section 412, a target pressure ratio (Pm1/Pa) of the time when VEL 112 is operated, to be specific, of the time when the VEL operating angle is controlled to the target operating angle TGVEL, is set by retrieving a table as shown in the figure, based on the target volume flow ratio TQH0VEL and the engine rotation speed Ne.

Then, in a KPA1 calculating section 413, a coefficient KPA1 is calculated by retrieving a table TBLKPA1 as shown in the figure, based on the target pressure ratio (Pm1/Pa). This coefficient KPA1 can be represented by the following equation (6) and corresponds to a value of the denominator in the equation (4).

$$KPA1 = \left(\frac{Pm1}{Pa}\right)^{\frac{1}{\gamma}} \sqrt{1-\left(\frac{Pm1}{Pa}\right)^{\frac{\gamma-1}{\gamma}}} \quad (6)$$

In a dividing section 414, by dividing the coefficient KPA0 by the coefficient KPA1, to set KAVEL (=KPA0/KPA1), and the set value is output to third multiplication section 404 (FIG. 14).

As described above, the intake air amount control by intake valve 105 according to operating conditions is realized.

Next, there will be described the calculation of the basic fuel injection quantity TP in accordance with block diagrams shown in FIG. 16 and FIG. 17.

Figure 16:
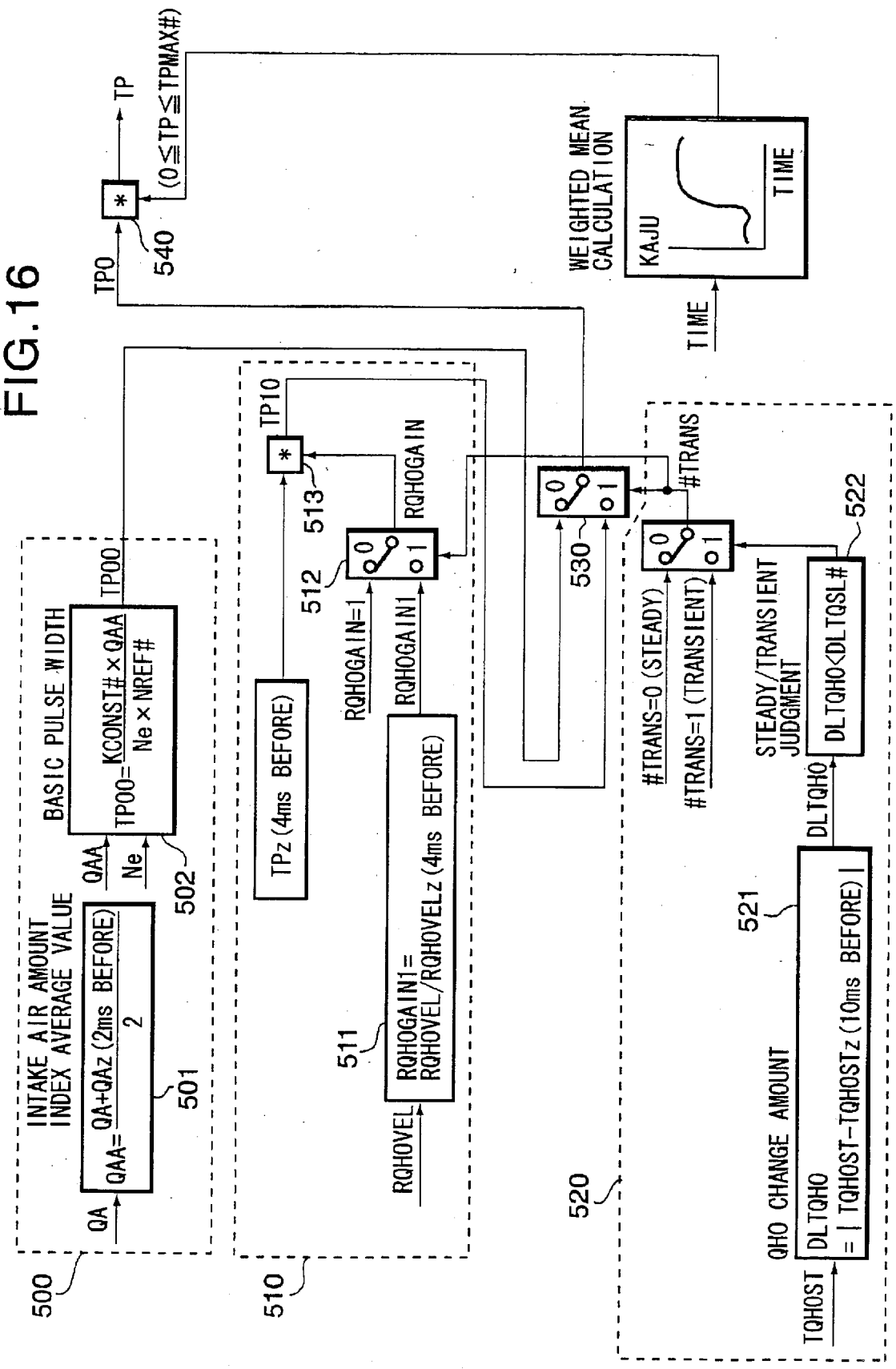
FIG. 16 is a block diagram showing a first embodiment of the calculation of a basic fuel injection quantity TP.

FIG. 16 shows a first embodiment of the calculation of the basic fuel injection quantity TP. In this embodiment, in the transient state, a change rate RQH0GAIN (=RQH0VEL/QH0VELz) between a presently calculated intake valve passing volume flow ratio RQH0VEL and a previously calculated value RQH0VELz, is multiplied on a previously set basic fuel injection quantity TPz, to calculate a present basic fuel injection quantity TP. Note, the calculation of the intake valve passing volume flow ratio RQH0VEL will be described later (refer to FIG. 17).

In FIG. 16, in a steady state basic fuel injection quantity calculating section 500, a steady state basic fuel injection quantity TP00 is calculated as follows.

Namely, in an air amount average value calculating section 501, an average (intake air amount index average value) QAA {=(QA+QAz)/2} between an air amount QA presently detected by air flow meter 202 and an air amount QAz (for example, before 2 ms) previously detected by air flow meter 202, is calculated.

In a basic fuel injection quantity calculating section 502, the steady state basic fuel injection quantity TP00 is calculated as in the following equation, based on the intake air amount index average value QM and the engine rotation speed Ne.

$$TP00 = QAA \times KCONST\#/(Ne \times NREF\#)$$

In the above equation, KCONST# and NREF# are constants.

On the other hand, in a transient state basic fuel injection quantity calculating section 510, a transient state basic fuel injection quantity TP010 is calculated as follows.

Namely, in a change rate calculating section 511, a change rate RQH0GAIN1 is calculated as in the following equation, based on the presently calculated intake valve passing volume flow ratio RQH0VEL and the previously calculated value RQH0VELz (for example, before 4 ms).

$$RQH0GAIN1 = RQH0VEL/RQH0VELz$$

In a first output switching section 512, an output thereof is switched depending on whether the engine is in the steady state or in the transient state. If the engine is in the transient state, the change rate RQH0GAIN1 is selected, and in a multiplication section 513, a previously set value TPz (before 4 ms as RQH0VELz) of the basic fuel injection quantity is multiplied by the change rate RQH0GAIN1, to calculate a transient state basic fuel injection quantity TP10 (=TPz×RQH0GAIN1).

Note, instead of the change rate RQH0GAIN1, a change amount (=RQH0VEL−RQH0VELz) may be calculated. In this case, instead of multiplication section 413, an adding section is provided, to add a value corresponding to a calculated change amount is added to the previous value TPz of basic fuel injection quantity, thereby calculating the transient state basic fuel injection quantity TP10.

Further, in a steady or transient judging section 520, it is judged whether the engine is in the steady state or in the transient state as follows.

Namely, in a volume flow ratio change amount calculating section 521, a change amount (an absolute value thereof) DLTQH0 of target volume flow ratio is calculated as follows, based on the presently calculated target volume flow ratio TQH0ST and the previously calculated value TQH0STz (for example, before 10 ms).

$$DLTQH0 = |TQH0ST - TQH0STz|$$

In a comparison section 522, the change amount DLTQH0 is compared with a predetermined amount DLTQSL# set in advance, and if the change amount DLTQH0 is equal to or larger than the predetermined amount DLTQSL#, it is judged that the engine is in the transient state, while if the change amount DLTQH0 is less than the predetermined amount DLTQSL#, it is judged that the engine is in the steady state. This judgment result is output to first output switching section 512 and a second output switching section 530.

In second output switching section 530, either the steady state basic fuel injection quantity TP00 or the transient state basic fuel injection quantity TP10 is selected depending on the transient or steady judgment result, and further, in a weighted mean processing section 540, the weighted mean calculation as in the following equation, for example, is performed to calculate the basic fuel injection quantity TP.

$$TP = TPz \text{ (previous value)} + (1-K) \times TP0 \text{ ($K$ is a weighting coefficient)}$$

Then, C/U 114 uses the basic fuel injection quantity TP to calculate a final fuel injection quantity Ti as in the following equation, and outputs the injection pulse signal corresponding to the calculated fuel injection quantity Ti to fuel injection valve 131 at predetermined timing synchronized with the engine rotation. Note, although the description is omitted, the ignition timing as controlled variable is also set corresponding to the fuel injection quantity Ti.

$$Ti = TP \times (1/\lambda t) \times (\alpha + UL + UK)$$

In the above equation, $\lambda t$: target air-fuel ratio, $\alpha$: air-fuel ratio feedback coefficient, UL: air-fuel ratio learning value, and UK: various coefficients.

Thus, even if the engine is in the transient state where the intake air amount is changed momentarily, it is possible to realize the fuel injection quantity control and the ignition timing control accurately corresponding to the change in intake air amount.

Here, there will be described the calculation of the intake valve passing volume flow ratio RQH0VEL. This calculation is performed such that an opening area of intake valve 105 is obtained based on the VEL operating angle (VCS−ANGL) and is converted into a volume flow ratio.

Figure 17:
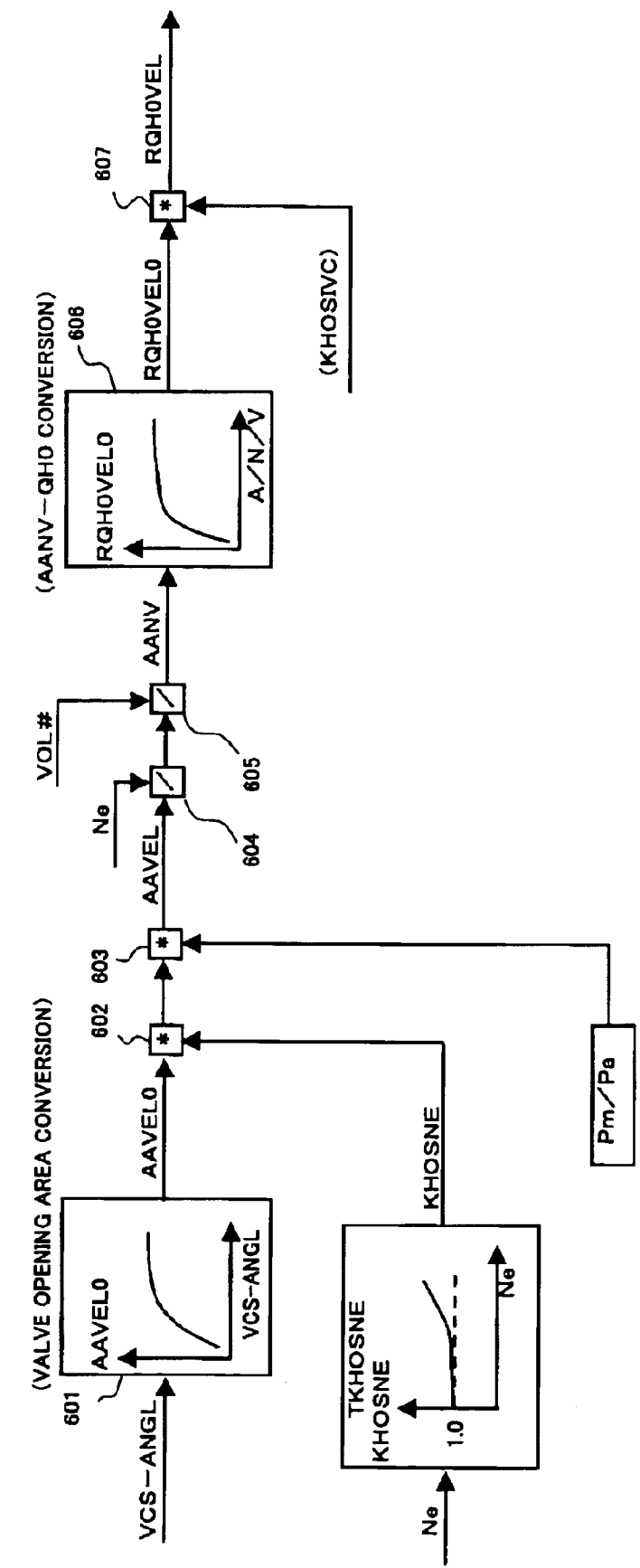
FIG. 17 is a block diagram showing the calculation of an intake valve passing volume flow amount.

To be specific, in the block diagram of FIG. 17, in an opening area conversion section 601, a basic opening area AAVEL0 of intake valve 105 is calculated, by retrieving a table as shown in the figure, based on the VEL operating angle (VCS−ANGL). Note, instead of VEL operating angle VCS−ANGL, the target operating angle TGVEL may be used for the calculation.

Next, the calculated basic opening area AAVEL0 is multiplied by a rotation based correction coefficient KHOSNE set, by retrieving a table as shown in the figure, based on the engine rotation speed Ne, in a rotation correcting section 602, and further multiplied by a ratio (Pm/Pa) between the actual intake manifold pressure Pm and the atmospheric pressure Pa, in an intake valve upstream pressure correcting section 603, to calculate an opening area AAVEL of intake valve 105. Such a correction is made taking into consideration that the opening area is increased due to an increase of inertial force with the rise of engine rotation speed Ne, and also that, even in the same opening area, the intake air amount is changed by an upstream pressure (intake pressure) of intake valve 105 generated by throttling throttle valve 103b.

Thereafter, the calculated opening area MVEL is divided by the engine rotation speed Ne, in a first dividing section 604, and further, divided by the discharge amount (cylinder volume) VOL#, in a second dividing section 605, to obtain a state amount AANV (A/N/V).

Then, using a conversion table as shown in the figure, the state amount AANV is converted into a volume flow ratio (RQH0VEL0), in a volume flow conversion section 606, and is multiplied by a valve timing based correction value KHOSIVC, in a VTC correcting section 607, to calculate the intake valve passing volume flow ratio RQH0VEL. Such a correction is made into consideration that the effective cylinder volume is changed with a change in closing timing IVC of intake valve 105 by VTC 113. The calculated RQH0VEL is output to the change rate calculating section 511 in FIG. 16.

Figure 18:
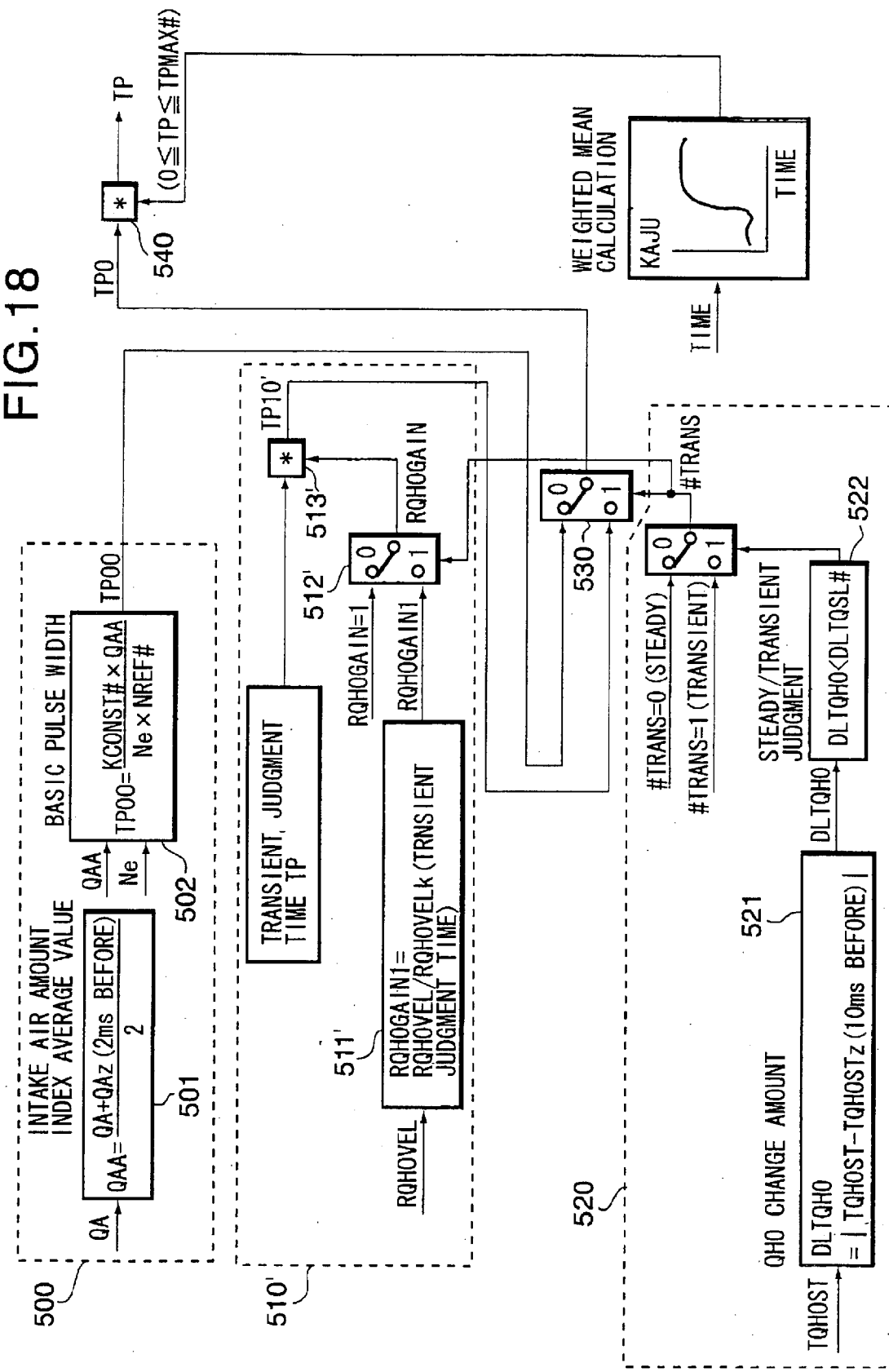
FIG. 18 is a block diagram showing a second embodiment of the calculation of the basic fuel injection quantity TP.

FIG. 18 shows a second embodiment of the calculation of the basic fuel injection quantity TP. This embodiment differs from the first embodiment (FIG. 16) in that a second change rate RQH0GAIN2 is calculated based on the presently calculated intake valve passing volume flow ratio RQH0VEL and an intake valve passing volume flow ratio RQH0VELk calculated at the time of the transient state judgment, and the calculated second change rate RQH0GAIN2 is multiplied on a basic fuel injection quantity TPk set at the time of (or immediately before) the transient state judgment, to calculate a transient state basic fuel injection quantity TP10'.

Namely, in a transient state basic fuel injection quantity calculating section 510', the second change rate RQH0GAIN2 is calculated as follows, based on the presently calculated intake valve passing volume flow ratio RQH0VEL and the intake valve passing volume flow ratio RQH0VELk calculated at the time of the transient state judgment, in a change rate calculating section 511'.

$$RQH0GAIN2 = RQH0VEL/RQH0VELk$$

In a first output switching section 512', an output thereof is switched depending on whether the engine is in the steady state or in the transient state. If the engine is in the transient state, the second change rate RQH0GAIN2 is selected, and in a multiplication section 513', the basic fuel injection quantity TPk set at the time of the transient state judgment is multiplied by the change rate RQH0GAIN2 to calculate the transient state basic fuel injection quantity TP10' (=TPk× RQH0GAIN2), which is output to second output switching section 530. As in the first embodiment, the calculation may be performed such that, instead of selecting second change rate RQH0GAIN2, the change amount (=RQH0VEL− RQH0VELk) is calculated, and the value corresponding to the calculated change amount is added to the basic fuel injection quantity TPk set at the time of the transient state judgment, to calculate the transient state basic fuel injection quantity TP10'.

Other sections are the same as those in the first embodiment. Accordingly, the same reference numerals are denoted and the description thereof is omitted.

Also in the second embodiment, it is possible to realize the fuel injection quantity control and the ignition timing control accurately corresponding to the change in intake air amount in the transient state.

As described in the above, according to the above embodiments, the constitution is such that the intake air amount controlled by the intake valve is calculated based on the valve operating characteristic of intake valve, and the newest engine controlled variable is calculated based on the change between the newest intake air amount calculation value and the past intake air amount calculation value, and the previously set engine controlled variable, to control the engine based on the calculated newest engine controlled variable. In such a constitution, since the present (newest) engine controlled variable is calculated, using the engine controlled variable set in the past, and the change (change rate or change amount) in the intake air amount calculation value from the past, which is capable of tracing with accuracy the change (change rate or change amount) of actual cylinder intake air amount, even in the transient state where the intake air amount is changed momentarily, it is possible to calculate the engine controlled variable accurately corresponding to the actual cylinder intake air amount, thereby improving the accuracy of engine control.

Further, when the engine is in the transient state (the state where the intake air amount is changed), the previously set engine controlled variable is corrected according to the change between the present (newest) intake air amount calculation value and the previous intake air amount calculation value, to calculate the present (newest) engine controlled variable, and the engine is controlled based on the calculated engine controlled variable, to thereby correct the previously set engine controlled variable according to the change in the intake air amount calculation value from the previous calculation value, which is capable of accurately tracing the change in actual cylinder intake air amount. Thus, it is possible to calculate the engine controlled variable accurately corresponding to the cylinder intake air amount which is changed momentarily.

Moreover, the similar effect can be obtained, even in the case where, when the engine is in the transient state, the engine controlled variable set at the time when the engine is judged to be in the transient state is corrected according to the change between the present (newest) intake air amount calculation value and the intake air amount calculation value of the time when the engine is judged to be in the transient state, to calculate the present (newest) engine controlled variable, and the engine is controlled based on the calculated engine controlled variable.

When the engine is in the steady state, the engine controlled variable is calculated based on the mass air amount detected on upstream side of the intake valve, and also when the engine is in the steady state where the cylinder intake air amount can be accurately detected by air amount detecting means, the controlled variable for the engine is calculated based on the detection value, thereby enabling the easy calculation of engine controlled variable while reducing the calculation burden.

The entire contents of Japanese Patent Application No. 2002-373659 filed Dec. 25, 2002, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed is:

1. A control apparatus of an internal combustion engine provided with a variable valve mechanism that varies a valve operating characteristic of an intake valve, comprising:

a valve operating characteristic detecting section that detects the valve operating characteristic of said intake valve;

an intake air amount calculating section that calculates an intake air amount controlled by said intake valve, based on the detected valve operating characteristic;

an engine controlled variable calculating section that calculates engine controlled variable; and a control section that executes a control of said internal combustion engine based on the engine controlled variable calculated in said engine controlled variable calculating section, wherein said engine controlled variable calculating section calculates a change between the newest intake air amount calculation value and a past intake air amount calculation value, and calculates the newest engine controlled variable based on the calculated change and engine controlled variable set in the past.

2. A control apparatus of an internal combustion engine according to claim 1,
wherein said variable valve mechanism varies a valve operating angle and a valve lift amount as the valve operating characteristic.

3. A control apparatus of an internal combustion engine according to claim 2,
wherein said variable valve mechanism further varies a center phase of the valve operating angle.

4. A control apparatus of an internal combustion engine according to claim 1,
wherein said valve operating characteristic detecting section detects a driving amount of said variable valve mechanism as a value correlating to the valve operating characteristic.

5. A control apparatus of an internal combustion engine according to claim 1, further comprising;
a state judging section that judges whether said internal combustion engine is in a steady state where an intake air amount is constant or in a transient state where the intake air amount is changed,
wherein said engine controlled variable calculating section calculates a change between the newest intake air amount calculation value and a previous intake air amount calculation value, to calculate the newest engine controlled variable based on the calculated change and previously set engine controlled variable, when said internal combustion engine is in the transient state.

6. A control apparatus of an internal combustion engine according to claim 1, further comprising;
a state judging section that judges whether said internal combustion engine is in a steady state where an intake air amount is constant or in a transient state where the intake air amount is changed,
wherein said engine controlled variable calculating section calculates a change between the newest intake air amount calculation value and an intake air amount calculation value of the time when said internal combustion is judged to be in the transient state, to calculate the newest engine controlled variable based on the calculated change and engine controlled variable set at the time when said internal combustion is judged to be in the transient state, when said internal combustion engine is in the transient state.

7. A control apparatus of an internal combustion engine according to claim 1, further comprising:
an air amount detecting sensor detecting a mass air amount on the upstream side of said intake valve; and
a state judging section that judges whether said internal combustion engine is in a steady state where an intake air amount is constant or in a transient state where the intake air amount is changed,
wherein said engine controlled variable calculating section calculates the engine controlled variable based on the detected mass air amount, when said internal combustion engine is in the steady state.

8. A control apparatus of an internal combustion engine according to claim 1,
wherein said engine controlled variable includes at least one of a fuel injection quantity and ignition timing.

9. A control apparatus of an internal combustion engine according to claim 2,
wherein said variable valve mechanism includes:
a camshaft rotating in synchronism with a crankshaft;
a control shaft disposed substantially in parallel to said camshaft;
a control cam eccentrically fixed to an outer periphery of said control shaft;
a rocker arm swingingly supported by said control cam;
a swinging drive member swingingly driving one end portion of said rocker arm according to the rotation of said camshaft;
a swing cam connected to the other end portion of said rocker arm, and swinging to open and close said intake valve; and
an actuator driving said control shaft to rotate.

10. A control apparatus of an internal combustion engine provided with a variable valve mechanism that varies a valve operating characteristic of an intake valve, comprising:
valve operating characteristic detecting means for detecting the valve operating characteristic of said intake valve;
intake air amount calculating means for calculating an intake air amount controlled by said intake valve, based on the detected valve operating characteristic;
engine controlled variable calculating means for calculating engine controlled variable; and
control means for executing a control of said internal combustion engine based on the engine controlled variable calculated by said engine controlled variable calculating means,
wherein said engine controlled variable calculating means calculates a change between the newest intake air amount calculation value and a past intake air amount calculation value, and calculates the newest engine controlled variable based on the calculated change and engine controlled variable set in the past.

11. A control method of an internal combustion engine provided with a variable valve mechanism that varies a valve operating characteristic of an intake valve, comprising the steps of:
detecting the valve operating characteristic of said intake valve;
calculating an intake air amount controlled by said intake valve, based on the detected valve operating characteristic;
calculating a change between the newest intake air amount calculation value and a past intake air amount calculation value, and calculating the newest engine controlled variable based on the calculated change and engine controlled variable set in the past; and
executing a control of said internal combustion engine based on the calculated newest engine controlled variable.

12. A control method of an internal combustion engine according to claim 11,
wherein said variable valve mechanism varies a valve operating angle and a valve lift amount as the valve operating characteristic.

13. A control method of an internal combustion engine according to claim 12,
wherein said variable valve mechanism further varies a center phase of the valve operating angle.

14. A control method of an internal combustion engine according to claim 11, wherein said step of detecting the valve operating characteristic detects a driving amount of said variable valve mechanism as a value correlating to the valve operating characteristic.

15. A control method of an internal combustion engine according to claim 11, further comprising the step of;

judging whether said internal combustion engine is in a steady state where an intake air amount is constant or in a transient state where the intake air amount is changed, wherein said step of calculating the newest engine controlled variable calculates a change between the newest intake air amount calculation value and a previous intake air amount calculation value, to calculate the newest engine controlled variable based on the calculated change and previously set engine controlled variable, when said internal combustion engine is in the transient state.

16. A control method of an internal combustion engine according to claim 11, further comprising the step of;

judging whether said internal combustion engine is in a steady state where an intake air amount is constant or in a transient state where the intake air amount is changed, wherein said step of calculating the newest engine controlled variable calculates a change between the newest intake air amount calculation value and an intake air amount calculation value of the time when said internal combustion is judged to be in the transient state, to calculate the newest engine controlled variable based on the calculated change and engine controlled variable set at the time when said internal combustion is judged to be in the transient state, when said internal combustion engine is in the transient state.

17. A control method of an internal combustion engine according to claim 11, further comprising the steps of:

detecting a mass air amount on the upstream side of said intake valve; and judging whether said internal combustion engine is in a steady state where an intake air amount is constant or in a transient state where the intake air amount is changed, wherein said step of calculating the newest engine controlled variable calculates the newest engine controlled variable based on the mass air amount, when said internal combustion engine is in the steady state.

18. A control method of an internal combustion engine according to claim 11, wherein said engine controlled variable includes at least one of a fuel injection quantity and ignition timing.

* * * * *